Nov. 3, 1953
R. KOLLER
2,657,683
CARDIO-PNEUMO-ELECTRODERMOGRAPH
Filed March 23, 1949
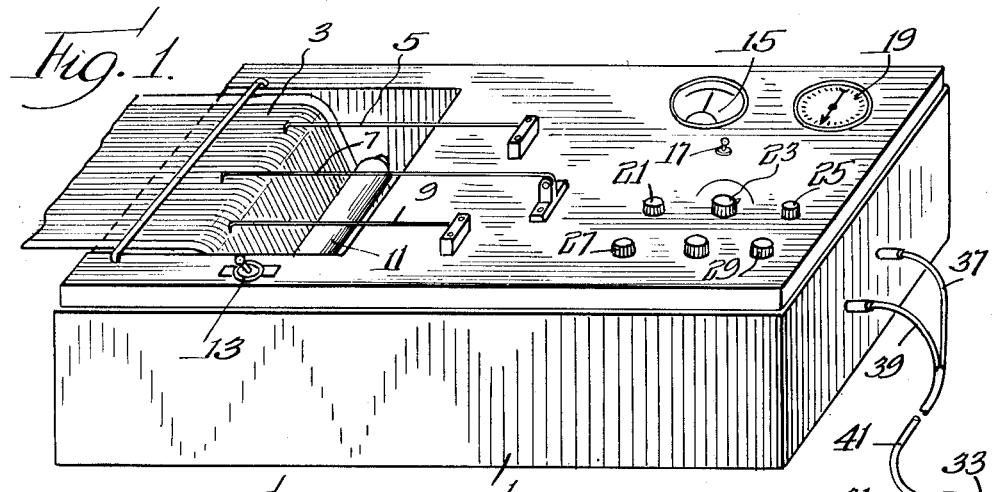
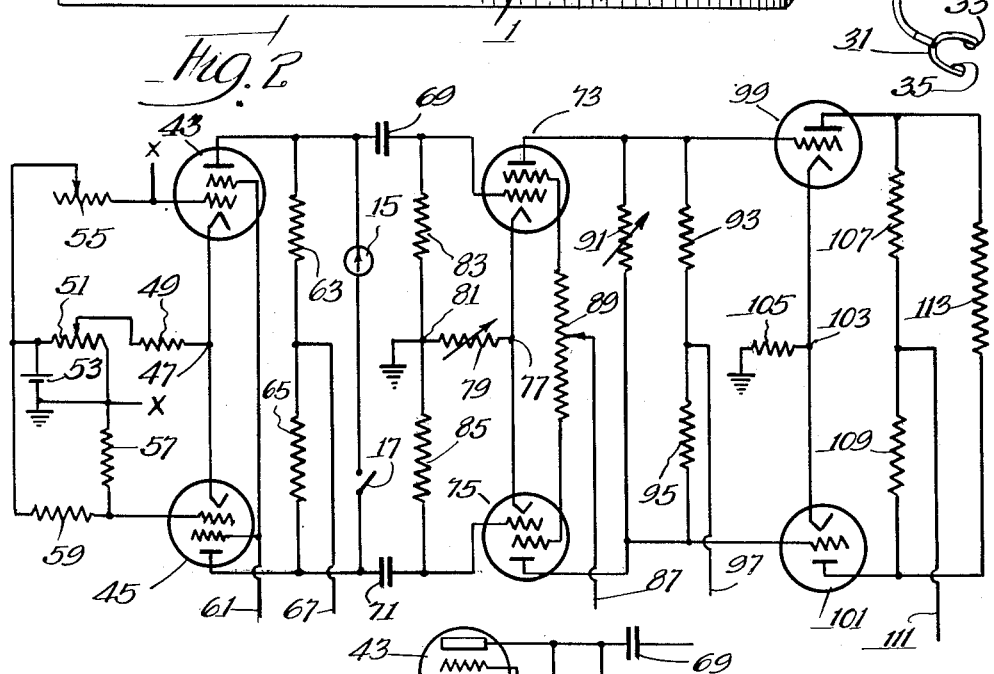
INVENTOR.
Robert Koller
BY
Moore, Olson & Trexler
Attys.

Patented Nov. 3, 1953

2,657,683

UNITED STATES PATENT OFFICE 2,657,683

CARDIO-PNEUMO-ELECTRODERMOGRAPH

Robert Koller, Elmhurst, Ill.

Application March 23, 1949, Serial No. 82,991

9 Claims. (Cl. 128—2.1)

This invention relates to a cardio-pneumo-electrodermograph, and more particularly to an electric circuit responsive to changes in bodily resistance and its relation to the other components of the device whereby certain functions of bodily resistance may be recorded and interpreted. The present assembly of components to make up a cardio-pneumo-electrodermograph, commonly termed lie detector, finds its origin in cruder combinations fifty or more years ago. They were then principally demonstration apparatus in psychological laboratories and only recently have the findings of psychologists and technicians been properly recognized and put to practical use. These lie detectors are now of invaluable aid in the detection of deception and in establishing to a high degree of accuracy the attempt to deceive. They are successfully used today in widely related places to ascertain the honesty and loyalty of employees such as in banks, large wholesale business houses, government agencies, etc. Their important value has been proven in many practical demonstrations and in subsequent results regarding guilt or innocence of suspected persons.

Mass screenings among a large group of persons to pick out the guilty person or persons can easily and readily be accomplished with the new constructional features of this lie detector which means a great saving in time to the operator. Certain operative functions of this apparatus automatically correct themselves without the attention of the operator or technician and without distorting the resulting pen tracing. More careful attention of the operator can therefore be paid to other phases of the test than has so far been possible. Truer and better results are claimed due to these basic and constructional improvements.

Lie detectors in general comprise mechanisms responsive to and recording certain functions of respiration, of heart-beat and blood pressure, and of changes in bodily electrical resistance. The present invention is particularly concerned with the latter as embodied in a portable lie detector.

When an inner conflict is created in a subject under test after a leading question has been put to him—provided his conduct has been knowingly faulty along the line of questioning—his emotional equilibrium will be upset. These consequent changes from normal give rise to small but significant physiological and biological corrections to new situations. One accompanying phase to this new condition of emotional state is that the electrical resisance of the subject's body will also change. This change is of course not instantaneous, but takes place over a period of a few seconds. Following this fairly rapid change the body may or may not return to its original condition of resistance and a gradual change in resistance will usually be found. The gradual change in resistance is of little interest here, but the more rapid changes occurring in a matter of seconds are of particular significance. The amplitude of change, as well as whether the resistance increases or decreases is of great significance and may be readily interpreted by a skilled operator. In earlier lie detectors the gradual change in the subject's resistance has tended to drive the recording pen off the paper and make the record useless. It has been common practice to return the pen to a zero line manually, but this had led to the inadvertent or intentional introduction of spurious responses which has caused great difficulty in interpretation of results and has caused courts to refuse to accept the results of lie detection tests as evidence. In the present invention a resistance measuring bridge circuit is used in conjunction with a special amplifier and a center-reading meter actuating a recording pen or stylus. The bridge is initially balanced with the subject's bodily resistance in one arm of the bridge. The initial unbalance of the bridge and subsequent changes in unbalance are amplified to operate a center-reading meter which has a stylus or pen as a pointer which leaves a permanent record on a moving strip of paper. In order to amplify only the relatively rapid changes occurring over a period of a few seconds and to return the meter to zero, the time constant of the coupling circuit in the amplifier is chosen with great care. As the cardio-pneumo-electrodermograph is unresponsive to the subject's gradual change of bodily resistance and the pen is automatically returned to zero following each question, the controls of the device may be locked at the start of operations and there is no possibility of spurious responses being introduced by the operator.

It is accordingly an object of the present invention to present a cardio-pneumo-electrodermograph in which the controls need not be manipulated once questioning of the subject starts.

It is another object of this invention to present a cardio-pneumo-electrodermograph, including electrical means responsive to relatively rapid changes in bodily resistance, such means controlling a center-reading recording or indicating instrument.

It is a further object to present such electrical means which return the recording or indicating instrument to a neutral position after each such variation in resistance, such return to be accomplished at a rate consistent with all factors involved.

Other and further objects and advantages of the present invention will become apparent to those skilled in the art by a perusal of the following description taken in conjunction with the accompanying drawings, in which:

Figure 1 is a perspective view of a portable lie detector embodying the present invention;

Figure 2 is a schematic diagram of the electric circuit responsive to variations in bodily resistance; and Figure 3 is an equivalent circuit diagram of the first stage of the circuit shown in Figure 2.

The example chosen for illustrative purposes includes a portable carrying case 1, in which is a moving strip of paper 3, on which the three self-inking pens or styluses 5, 7 and 9 record significant data concerning the heart-beat, respiration, and changes in bodily resistance. The stylus 7 is the one recording changes in bodily resistance and is the one with which the current invention is particularly concerned. The styluses 5 and 9 record data pertaining to heart-beat and blood pressure and to respiration. The moving strip of paper 3 is fed from a roll 11 by means of an electric motor, not shown, which is controlled by the switch 13. A center-reading d'Arsonval galvanometer 15 is used to indicate increments of unbalance of a Wheatstone bridge as will be explained in due time. A push button switch 17 is in series with the galvanometer 15 so that the galvanometer will be in the circuit only long enough to indicate a balance. The meter 19 is concerned with the part of the apparatus indicating functions of heart-beat and blood pressure and will accordingly not be referred to in any detail. The knob 21 is for controlling the pen centering, the knob 23 controls the coarse adjustment of the Wheatstone bridge controlling the galvanometer displacement, and the knob 25 controls the fine adjustment of the bridge as will be explained later. Knob 27 controls the sensitivity of the electrical circuit, and the knob 29 is an on-off switch for the electrical circuit. The operation of the foregoing will be described shortly.

A stirrup-like member 31 is hinged in its center and has a spring urging its extremities together. Sponge-like substances are saturated in a saline solution and inserted in the electrode holders 33 and 35 in the stirrup-like member 31. The sponge-like substances are then held against the palm and back of the subject's hand by the stirrup-like member 31. A pair of wires 37 and 39 which may be enclosed in a sheath 41 lead from the electrodes 33 and 35 to the points $x$—$x$ shown on the electric circuit push-pull amplifying means or in Figure 2. The first stage of the electric circuit comprises a plurality of electronic tubes 43 and 45. Although these tubes are shown as each having two grids, it is to be understood that more or less grids than this could be used. The cathodes of the two tubes 43 and 45 meet at a common juncture 47 and pass through a resistor 49 and the movable tap on a potentiometer 51. One end of the potentiometer 51 is connected to the positive terminal of a battery 53 and to the movable arm of a second potentiometer 55. One end of the potentiometer 55 is unconnected, and the other end is connected to the first grid of the tube 43 and to one of the points $x$ leading to the electrodes on the subject's hand. The negative terminal of the battery 53 is connected to ground as well as to the second end of the potentiometer 51 and the second point $x$ leading to the other electrode on the subject's hand. It is likewise connected to one end of a resistor 57 leading to the first grid of the tube 45. To the first grid of the tube 45 is also connected a resistor 59, the other end of which is connected to the positive terminal of the battery 53. The second grids of the tubes 43 and 45 are connected through a wire 61 to a suitable source of potential. Potential is applied to the plates of the tubes 43 and 45 through plate resistors 63 and 65 respectively, and a wire 67 leading to a suitable source of potential. The galvanometer 15 previously referred to is connected between the plates of the tubes 43 and 45 in series with the aforementioned push button switch 17. Coupling condensers 69 and 71 lead from the plates of the tubes 43 and 45 to the first grids of the electronic tubes 73 and 75 respectively. The cathodes of these two latter tubes meet at a common juncture 77 which is in turn connected to a variable resistor 79, the other end of which is grounded at 81. The first grids of the two tubes 73 and 75 are connected through resistors 83 and 85 respectively to the aforementioned ground point 81. The relative amplification of the two tubes 73 and 75 is controlled by a suitable source of potential connected to a wire 87 and which leads through a tap on a variable resistor 89 to the second grids of the tubes 73 and 75. It is thus apparent that these two tubes must have more than one grid, and the use of more than two grids is contemplated. A variable resistor 91 is connected between the plates of the two tubes 73 and 75 as are two resistors 93 and 95 through which a suitable potential is applied to the plates from the wire 97. The grids of the two tubes 99 and 101 are connected directly to the plates of the tubes 73 and 75. The cathodes of the tubes 99 and 101 meet at a common point 103 and are grounded through a resistor 105. Potential is applied to the plates of the tubes 99 and 101 through a pair of resistors 107 and 109 which are in turn supplied by the wire 111 from a suitable source. The resistance 113 represents the impedance offered by a center-reading d'Arsonval galvanometer movement actuating the pen or stylus 7.

The operation of the device is as follows:

Suitable potentials are supplied to the electric circuit by closing the switch 29, and the screw driver adjustable resistances 51 and 79 are set to cause the tubes to operate within their linear response regions. This adjustment need be made only occasionally to compensate for changes in the electrical characteristics of the tube with age or upon the insertion of new tubes. The tap on the resistor 89 is adjusted if need be to set the pen or stylus on the zero line. The electrodes 33 and 35 are then clamped on the subject's hand. As may be best seen in Figure 3, resistors 55, 57 and 59 with the resistance of the subject's hand between the points $x$—$x$ constitute a Wheatstone bridge in which the resistance of the subject's hand is the unknown resistance. The resistor 55 which is shown for simplicity as a potentiometer is preferably a decade resistor controlled by coarse and fine adjustment knobs 23 and 25 respectively and is varied to balance the bridge. As it is desired that the potential on the plates of the tubes 43 and 45 should be equal, the galvanometer 15 is placed across these plates to indicate the balance of the bridge. The push button switch 17 is closed only long enough to determine proper balance. When the resistance of the subject's hand changes relatively rapidly due to a rather quick change in emotional state the bridge will be unbalanced and the relative potentials on the control grids of the tubes 43 and 45 will change rapidly and the resultant amplified change will be transmitted by the condensers 69 and 71 to the control grids of the tubes 73 and 75. The time constant of these condensers and the resistances through which they charge and discharge are chosen with care so that a variation occurring over a period of a few seconds will be transmitted and all other variations will be eliminated. It is then desired that the charge should leak off the condensers at a rate consistent with all factors involved. As the relatively rapid change in potential is passed by the condensers 69 and 71 to the control grids of the tubes 73 and 75, the change is amplified and passed on to the control grids of the tubes 99 and 101. The overall gain or sensitivity of the circuit may be controlled by adjustment of the attenuating resistor 91 by means of the knob 27, though this should be left alone once the interrogation has started. This gain control is necessary as different subjects will react with different degrees of intensity. The amplified charges applied to the grids of the tubes 99 and 101 are of opposite polarity and cause the plate potential of one tube to rise and that of the other to drop. This creates a potential difference across the galvanometer movement 113 and deflects the pen or stylus 7. The charge quickly leaks off the condensers 69 and 71 and the remainder of the circuit comprising the stages in which the tubes 73, 75, 99 and 101 are found then returns to its original balanced condition and as no potential is applied across the galvanometer movement 113 the pen or stylus 7 returns to its neutral position. Although the bridge may be no longer balanced, subsequent relatively rapid changes of resistance will porduce pulses and reactions similar to that just described.

It will now be apparent to those skilled in the art that an improved circuit responsive to relatively rapid changes in bodily resistance has been presented for use in a cardio-pneumatic-electrodermograph, and that this circuit is adapted to cause the recording pen or stylus to return to its neutral position following each instantaneous variation and thus eliminate the possibility of error or deceit by the operator and to present a more readily readable record. Although a specific example has been shown and described, it is to be understood that my invention is to be limited only by the following claims.

I claim:

1. A cardio-pneumo-electrodermograph comprising a plurality of electrodes for contact with a person's epidermis, an electrical circuit with the input thereof including a bridge circuit having an arm thereof including two of said electrodes and responsive to variations in the resistance between said electrodes, and an indicating instrument connected to, and controlled by said electric circuit for indicating a function of changes in bodily resistance, said circuit including circuit elements of suitable values to cause said indicating instrument to indicate only relatively rapid variations of resistance between said electrodes and to return said instrument to zero following each relatively rapid change in resistance.

2. A cardio-pneumo-electrodermograph comprising electrical means comprising a bridge circuit, electrode means for including a person's bodily resistance in one arm of said bridge circuit, means for amplifying relatively rapid changes in unbalance of the bridge due to relatively rapid changes in said resistance, said amplifying means being unresponsive to gradual changes in resistance, and a center-reading recording meter having means urging said meter toward its center position, said amplifying means including coupling means for causing said meter to deviate from its center position in response to said rapid changes and controlling return of said center-reading meter to its center position following each variation.

3. A cardio-pneumo-electrodermograph comprising a plurality of electrodes for contact with a person's epidermis, the resistance between said electrodes comprising one arm of a Wheatstone bridge, diametrically opposite corners of said bridge being connected to the control grids of a pair of electronic tubes, a galvanometer connectable between the plates of said electronic tubes whereby to indicate when said bridge is properly balanced, and a center-reading indicating instrument connected to the amplified output of said pair of electronic tubes.

4. A cardio-pneumo-electrodermograph comprising a plurality of electrodes for contact with a person's epidermis, bridge means including two electrodes connected to one arm thereof, a push-pull electronic circuit responsive to variations of resistance between said electrodes and including electronic tubes having a plurality of electrodes, said electronic circuit having means for controlling the indications of a center-reading indicating instrument, and means for controlling the potential applied to an electrode in at least one electronic tube of said electronic circuit whereby to cause said indicating instrument to be at a given reference point prior to the operation of said cardio-pneumo-electrodermograph.

5. A cardio-pneumo-electrodermograph comprising electrode means for contact with a subject's epidermis, a bridge including two electrodes connected in one arm thereof, push-pull electronic amplifying means having the input thereof connected to said bridge for amplifying voltage variations across said bridge, said push-pull amplifying means having coupling means each having a suitable time constant to respond to changes of bodily resistance between said electrodes occurring over a period of a few seconds, and a center-reading indicating instrument the indication of which is controlled by the relative amplification of the two sides of said push-pull amplifying means, said coupling means including means for returning said two sides of said push-pull amplifying means to substantially equal degrees of amplification to control return of said indicating instrument to its center-position following each relatively rapid change of resistance between said electrodes.

6. A cardio-pneumo-electrodermograph comprising a plurality of electrodes for contact with a person's epidermis, said electrodes being connected to the input of an electrical circuit including bridge means responsive to changes of resistance between said electrodes, said electrical circuit comprising a plurality of stages of electronic amplification for amplifying voltage changes across said bridge means and coupling means between at least some of said stages having a suitable time constant to respond to changes occurring over a period of a few seconds, and an indicating instrument controlled by said electrical circuit to indicate such changes, said indicating instrument including means to effect return thereof to its initial position following each relatively rapid change of resistance between said electrodes.

7. A cardio-pneumo-electrodermograph comprising a plurality of electrodes for contact with a person's epidermis, said electrodes being connected to the input of an electrical circuit including bridge means responsive to changes of resistance between said electrodes, said electrical circuit comprising electronic amplifying means for amplifying voltage changes across said bridge means and coupling means in circuit with said electrodes and said electronic amplifying means, said coupling means having a suitable time constant to respond to changes of resistance between said electrodes occurring over a period of a few seconds, and a center-reading indicating instrument controlled by said electrical circuit to indicate such changes, said indicating instrument including means to effect return thereof to its center position following each relatively rapid change of resistance between said electrodes.

8. A cardio-pneumo-electrodermograph comprising a plurality of electrodes for contact with a person's epidermis, an electrical circuit having input means providing a voltage varying with changes in bodily resistance between said electrodes, said electrodes being connected to the input of said electrical circuit, said electrical circuit having amplifying means responsive to changes of bodily resistance between said electrodes occurring over a period of a few seconds and including coupling means with a suitable time constant; and a center-reading indicating means to indicate such changes in bodily resistance controlled by said electrical circuit, said coupling means acting to control the return of said indicating instrument to its center position following each relatively rapid change of resistance between said electrodes, and said indicating instrument including a stylus spring urged to a central position and under control of a galvanometer movement whereby to make a permanent record on a moving strip.

9. A cardio-pneumo-electrodermograph including a plurality of electrodes, bridge means including two electrodes connected in one arm thereof, push-pull amplifying means connected to said bridge means and thereby responsive to variations in resistance between said electrodes and controlling the position of a center-reading stylus, and means for varying the relative amplification of the sides of said push-pull amplifying means to balance said stylus at a point prior to the operation of said cardio-pneumo-electrodermograph.

ROBERT KOLLER.

References Cited in the file of this patent

UNITED STATES PATENTS

| Number | Name | Date |
|---|---|---|
| 1,681,628 | Schwartzkopf et al. | Aug. 21, 1928 |
| 1,761,476 | Hathaway | June 3, 1930 |
| 2,211,105 | Dunn | Aug. 13, 1940 |
| 2,308,933 | Raesler | Jan. 19, 1943 |
| 2,339,579 | Milne et al. | Jan. 18, 1944 |
| 2,379,955 | Eilenberger | July 10, 1945 |
| 2,535,249 | Wilhelm | Dec. 26, 1950 |